United States Patent [19]
Rodolf

[11] Patent Number: 4,586,228
[45] Date of Patent: May 6, 1986

[54] TOOL KIT FOR INSTALLING TRANSMISSION SEALS

[76] Inventor: Charles A. Rodolf, 10304 - 15th Ave. N.W., Seattle, Wash. 98177

[21] Appl. No.: 641,818

[22] Filed: Aug. 16, 1984

[51] Int. Cl.[4] .............................. B23P 19/02
[52] U.S. Cl. .............................. 29/235; 29/275; 206/372; 206/230
[58] Field of Search .............. 206/372, 375, 378, 230, 206/231; 211/60 T; 29/235, 254, 255, 275, 278

[56] References Cited

U.S. PATENT DOCUMENTS

| | | | |
|---|---|---|---|
| 2,284,522 | 5/1942 | Keen | 29/275 |
| 2,861,330 | 11/1958 | Kratz | 29/275 |
| 4,150,746 | 4/1979 | Buglione | 206/378 |
| 4,337,860 | 7/1982 | Carrigan | 206/378 |
| 4,421,230 | 12/1983 | Stanton | 206/378 |

*Primary Examiner*—Robert C. Watson
*Attorney, Agent, or Firm*—Ward Brown; Robert W. Beach

[57] ABSTRACT

A composite seal-installing driver includes an elongated base or handle portion with a socket in one end and any selected one of a plurality of interchangeable adapters each having an end projection manually fittable in the base socket so as to connect the base and the adapter. Each adapter has a flat flange for engaging the back of an annular seal to be installed in the hole of the transmission housing into which a shaft of the transmission projects and a central cylindrical projection over which the seal ring is fitted and slid rearward into engagement with the flange. The cylindrical projection is fitted into the transmission housing hole and guides movement of the seal toward the hole. Force is applied to the base of the driver to press-fit the seal into the hole. The diameters and lengths of the central projections of the adapters vary so that, by selecting the appropriate adapter, seals of different sizes can be installed in transmissions of different manufacturers.

5 Claims, 10 Drawing Figures

Fig. 8.
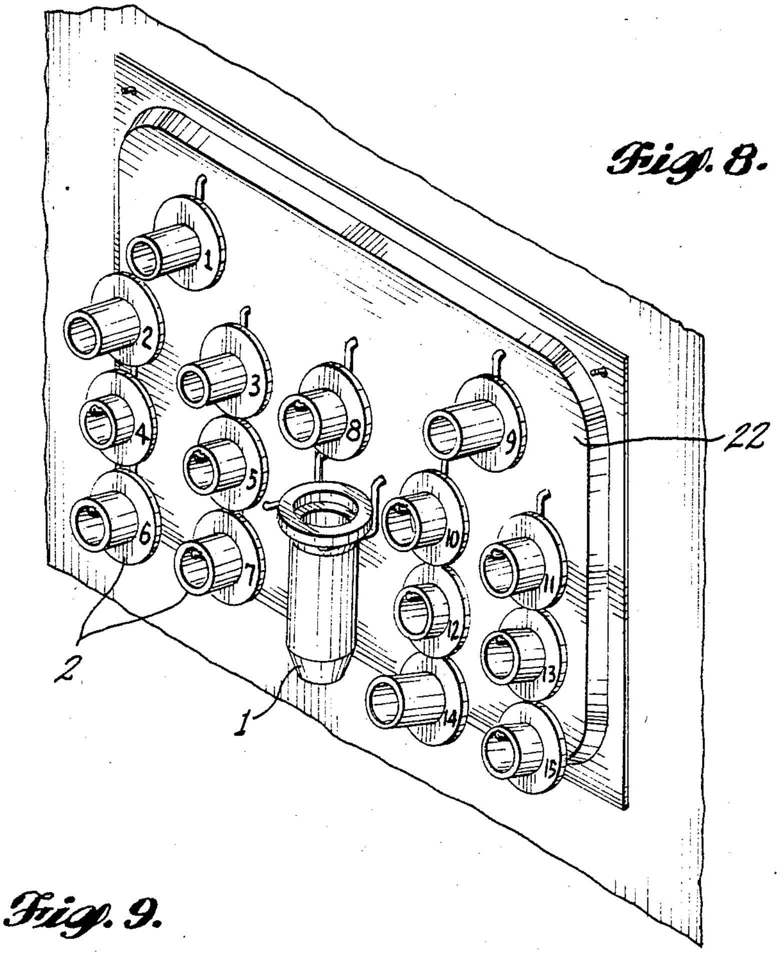
Fig. 9.
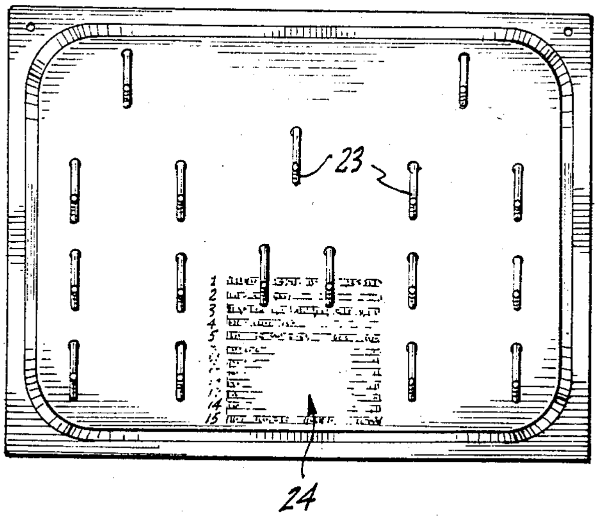
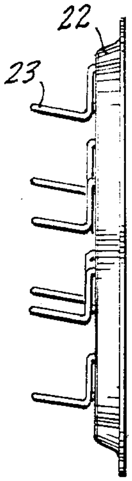
Fig. 10.

TOOL KIT FOR INSTALLING TRANSMISSION SEALS

BACKGROUND OF THE INVENTION

1. Field of the Invention

The present invention relates to a special tool used in installing seals in vehicle transmissions, and to a tool kit having at least some interchangeable parts and usable in installing seals of different sizes and designs in vehicle transmissions of different manufacturers.

2. Prior Art

Representative transmissions of the type with which the present invention is concerned have input and output shafts extending, respectively, into and out of the transmission housing which contains liquid lubricant. Annular seals encircling the shafts have rigid bodies or cups pressed into the housing holes through which the shafts extend. Resilient rings extend inward from the rigid bodies and snugly engage the shafts, or couplings for them, to prevent the liquid lubricant from leaking from the housing. These seals can become worn or damaged and require replacement.

A known special tool used in installing a new seal has a flat annular flange to engage the back of the seal and a short central cylindrical projection over which the seal ring is inserted. A problem with the known tool is that the seal fits loosely on the projection and may not be held in precise registration with the housing hole into which the seal is to be pressed. Consequently, the seal can become damaged during installation so as to allow lubricant to leak past it, which may not be discovered until after complete reassembly of the transmission and a road test of the vehicle.

In addition, each of the known tools accomodates a seal of only one size and design for a transmission of only one manufacturer. To accomodate seals of different sizes and designs for transmissions of different manufacturers, several of the known special tools are required.

SUMMARY OF THE INVENTION

It is an object of the present invention to provide a tool for installing transmission seals reliably, easily and without damage to the seals.

In accordance with the above object, it is an object of the present invention to provide such a tool for snugly holding a new transmission seal and for precisely guiding it as it is installed.

It also is an object to provide such a tool or a tool kit usable in installing seals of different sizes and designs in transmissions of different manufacturers.

An additional object is to provide such a tool or a tool kit which is of simple design and inexpensive to manufacture.

In the preferred embodiment of the present invention, the foregoing objects are accomplished by providing a tool kit including a composite driver having an elongated base or handle portion with a socket in one end and a plurality of interchangable adapters each having an end projection fittable in the base socket. Each adapter has a flat flange for engaging the back of a transmission seal to be installed and a central cylindrical projection over which the resilient seal ring is fitted. The diameter of the central projection is large enough so that the inner circumference of the seal ring is expanded as it is inserted over the projection to hold the seal snugly in position. The central projection of the adapter is several times longer than the axial length of the seal so that close sliding movement of the projection into the transmission guides the seal precisely into its hole.

BRIEF DESCRIPTION OF THE DRAWINGS

FIG. 8 is a top perspective of a tool kit in accordance with the present invention including the handle component, several adapter components and a wall-mountable rack for such components; FIG. 9 is a front elevation of the rack shown in FIG. 8; and FIG. 10 is an edge elevation of the rack shown in FIG. 8.

DETAILED DESCRIPTION OF THE PREFERRED EMBODIMENT

The tool and tool kit of the present invention are used to install the conventional annular seals that prevent liquid lubricant from leaking out of a transmission housing through the holes from which the input and output shafts project.

Representative of the type of transmission with which the present invention can be used is the transmission for a front engine, rear wheel drive truck or automobile. Such a transmission has an input shaft projecting forward through a central hole in the front end plate of the transmission housing or casing for connection to the engine flywheel. An output shaft projects rearward through the tip of a rearwardly tapered extension housing for connection to the drive shaft.

The holes for the input and output shafts form sockets into which the cups of the seals are pressed. The radially inner resilient seal rings are engaged against the rotating shafts or, in the case of most rear seals for output shafts, against the outer periphery of the universal joint coupling which is slid over the rear end portion of the output shaft. The shafts, or couplings, usually are journaled in bushings or bearings carried inside the transmission housing.

Figure 1:
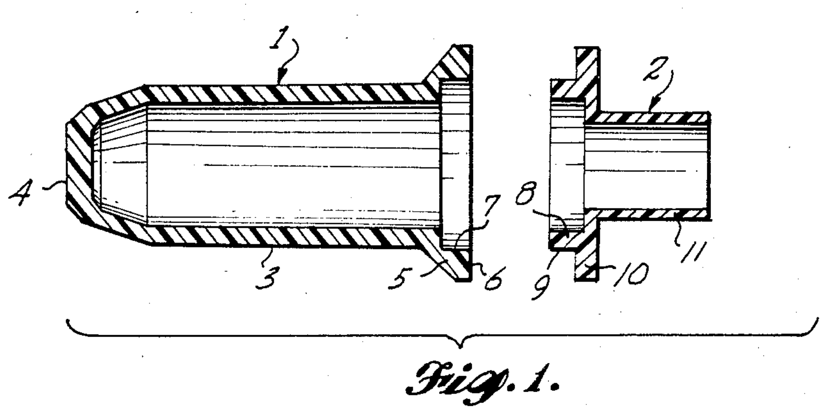
FIG. 1 is an axial section of a tool in accordance with the present invention showing the handle and a representative adapter of such tool in exploded relationship.
Figure 2:
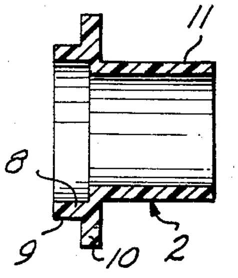
FIGS. 2, 3 and 4 are corresponding axial sections of other interchangeable adapters.
Figure 3:
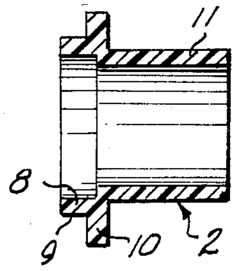
Figure 4:
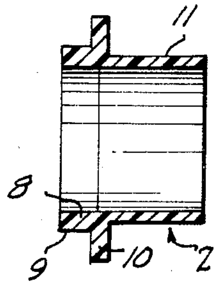

As shown in FIG. 1, the preferred tool in accordance with the present invention is a composite driver having an elongated base 1 and a separate adapter 2. The base has a cylindrical central portion 3 forming a handle with a closed rear end portion 4 to which driving force is applied such as by a rubber mallet. The front end portion 5 of the base is flared outward to form an annular flange 6 having a flat radial surface lying in a plane perpendicular to the axis of the base. Such flange encircles a central recess forming a socket having a substantially cylindrical wall 7 extending rearward substantially coaxial with the remainder of the base.

The adapter 2 has a short rear projection 8 with an outer cylindrical wall 9 shaped complementally to the inner wall 7 of the base socket, so that the adapter can be snugly but removably connected to the base by manually press-fitting the adapter rear projection into the base socket. An intermediate annular flange 10 of the adapter has a flat radial rear face to substantially contiguously engage the front face of the base flange 6. The front portion of the adapter is a long hollow cylinder 11 projecting forward from flange 9, coaxial with the base when the base and adapter are connected.

So that the adapter can be manually removed from the base, preferably both components are molded of tough and strong, but slippery, plastic material such as high density polyethylene. In addition, preferably the adapter rear projection 8 and the base socket into which it fits are complementally tapered slightly rearward, such as at an angle of one or two degrees, to provide a wedging fit.

In a tool kit in accordance with the present invention, a single base and several adapters are provided, four such adapters being shown in FIGS. 1, 2, 3 and 4. For each adapter the short rear projection 8 and intermediate annular flange 10 are identical to the corresponding parts of each of the other adapters. Consequently, the adapters are interchangably connectible to the base. Also, each of the adapters has the longer hollow front cylinder 11, but the cylinders differ in diameter and, in some cases, length depending on the size of the seal to be installed and the design of the transmission in which the seal is to be installed.

Figure 5:
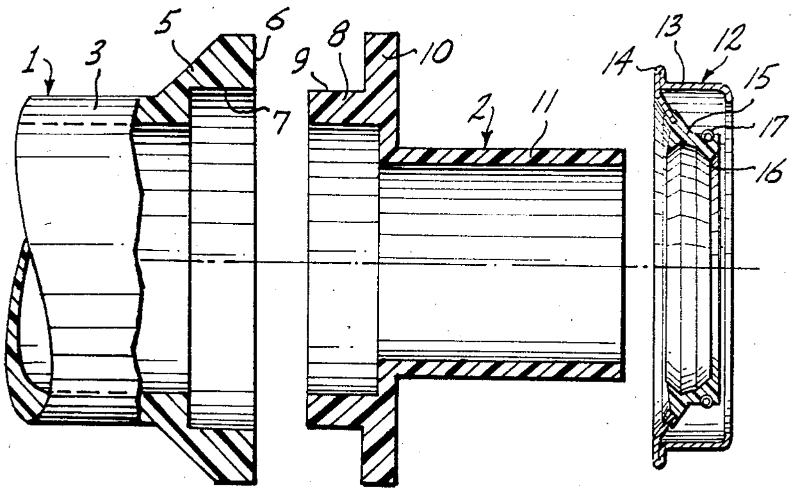
FIG. 5 is a fragmentary, enlarged, side elevation of a tool in accordance with the present invention showing the handle and adapter components and a representative seal in exploded relationship, with parts broken away.

For example, a representative seal 12 is shown in FIG. 5. Such seal has a rigid or substantially rigid outer cup 13 the forward portion of which is intended to be press fitted in the transmission housing hole for the input or output shaft. Usually a rear, outwardly projecting lip 14 is provided to engage against the transmission housing around the hole to limit the extent of insertion of the seal. The resilient inner ring 15 of the seal is carried by the rigid outer cup. The inner circumference 16 of the seal ring is intended to ride on the shaft, or a coupling for it, and usually is backed by a stiffer resilient member such as a tightly wound coil spring 17.

As also shown in FIG. 5, the outside diameter of the adapter front cylinder 11 is slightly greater than the minimum inside diameter of the seal 12 with which the adapter is intended to be used. As the seal ring 15 is slid over the cylinder, the seal ring is expanded so that the seal is snugly carried on the cylinder. Preferably, the seal is inserted all the way onto the cylinder with its rear face in engagement with the front face of the adapter intermediate flange 10.

Figure 6:
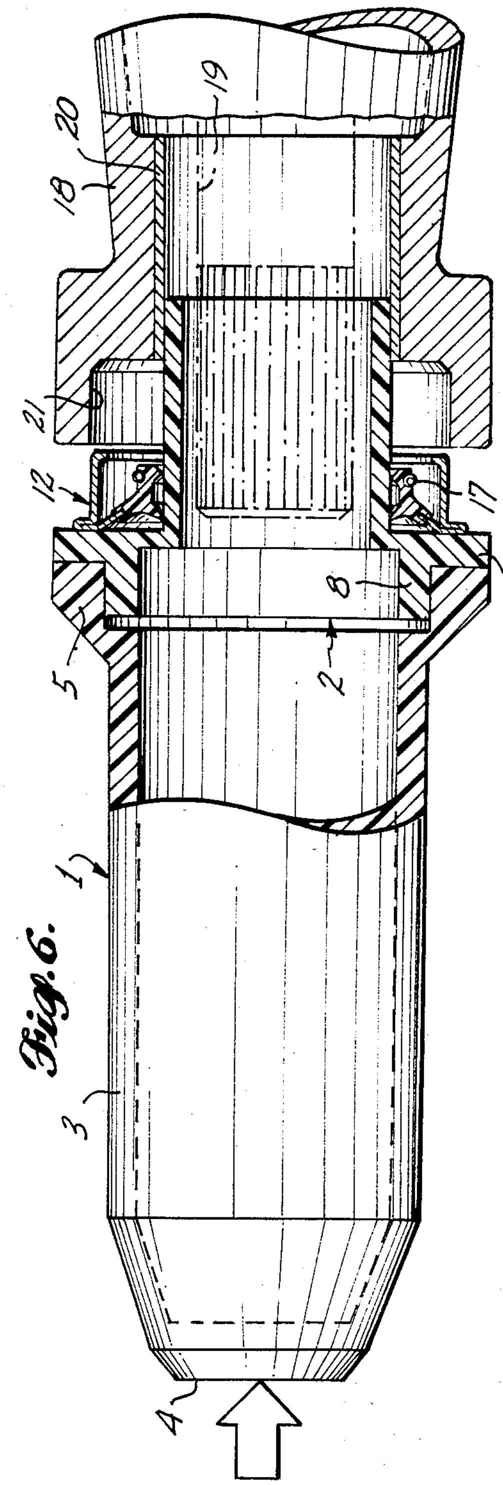
FIGS. 6 and 7 are corresponding, somewhat diagramatic, side elevations corresponding to FIG. 5 and illustrating sequential relationships of parts which occur during the procedure of installing a transmission seal using a tool in accordance with the present invention, with parts broken away.
Figure 7:
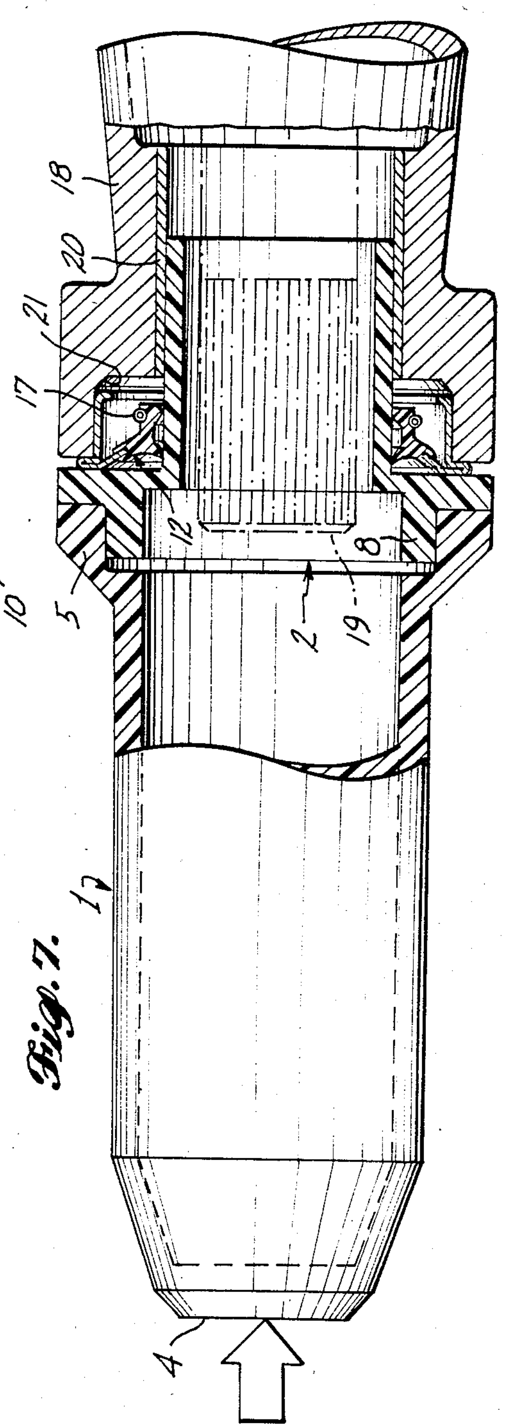

With respect to the length of the adapter cylinder 11, wherever possible it is preferred that the cylinder be at least several times longer than the axial length of seal. The advantage of using a long cylinder is apparent from FIGS. 6 and 7 which illustrate the use of a tool in accordance with the present invention for installing the seal. In FIGS. 6 and 7, the rear extension housing 18 of a representative transmission is shown somewhat diagramatically. The diameter of the output shaft 19 is much smaller than the inner diameter of the hole through which it projects, space being provided for the cylindrical universal joint coupling which, at the time of final installation, is slid over the output shaft and is journaled in the bushing 20.

When a new seal 12 is being installed, however, the output shaft 19 fits loosely in the bore of the cylinder 11 of the adapter 2 carrying the new seal. As seen in FIG. 6, even before the front edge of the seal cup reaches the socket 21 formed in the rear end of the extension housing, the tip portion of the cylinder 11 slides along the inner face of the bushing 20 so that, as the adapter is moved farther into the extension housing, the adapter and seal are guided for precise movement axially of the extension housing and the seal cup is presented square to the housing socket 21. After engagement of the front end of the seal cup in the extension housing socket, force is applied to the closed end of the driver base 1, as indicated by the arrow in FIG. 6, to press the seal full into the socket as shown in FIG. 7.

As best seen in FIGS. 6 and 7, preferably the adapter rear projection 8 is substantially shorter than the depth of the socket formed in the open end of the base 1. This assures that force applied to the closed end of the base is transferred directly through its flange 5 and the intermediate flange 10 of the adapter to the outer portion of the seal cup without applying localized force to the narrow end of the adapter rear projection 8 or to the narrow section of material joining the adapter flange 10 with the leading cylinder 11.

After the seal has been installed, the driver is slid rearward and the transmission is ready to receive the cylindrical universal joint coupling.

In prior one-piece special tools for installing seals, the diameter of a corresponding front cylinder is much smaller and such cylinder is shorter. Consequently, the seal may not be presented square to the extension housing socket which can result in bending or denting the seal cup. Another common problem with the known one-piece special tool that results from the seal-carrying cylinder being of smaller diameter and shorter than the front cylinder of the tool in accordance with the present invention is that the resilient ring of the seal is fully relaxed as the seal is installed. It is not unusual for the coil spring 17 to become dislodged, and it is very difficult to replace the spring without removing the seal.

The preferred form of the tool kit in accordance with the present invention is shown in FIGS. 8, 9 and 10. The base 1 and the several adapters 2 can be mounted on a rack which includes a wall-mountable board 22 having projecting pegs 23 for receiving all of the components of the kit. Preferably each adapter has identifying indicia, such as a number as seen in FIG. 8, and the board has corresponding identifying indicia adjacent to the pegs as seen in FIG. 9. As also seen in FIG. 9, preferably a legend 24 is provided on the board identifying the particular transmission in which each of the numbered adapters can insert seals. For example, the legend can indicate the manufacturer's number or numbers for the one-piece special tool or tools replaced by the corresponding adapter in accordance with the present invention.

I claim:

1. A tool for installing an annular seal having a substantially rigid outer body and a resilient inner ring in the hole of a vehicle housing into which a shaft of the vehicle extends, said tool comprising separate base and adapter components manually connectible to form an elongated composite driver having a rear end portion formed by said base component and a front end portion formed by said adapter component, said adapter component having a central hollow projection extending forward from said base component when said composite are connected, the outer diameter of said central hollow projection being small enough that the resilient ring of the seal can be inserted over said central hollow projection so as to be carried thereby, the inner diameter of said central hollow projection being large enough that said central hollow projection can be inserted over the vehicle shaft, said base component being elongated and having a closed rear end portion adapted to have force applied to it, an elongated central portion forming a handle and a front end portion connected to said central portion, the front end of said base component forming an annular flange having a flat radial surface lying in a plane perpendicular to the axis of said base component and a central recess forming a socket encircled by said flange, said adapter component having a rear end projection shaped complementally to said base socket and manually insertable therein to connect snugly but manually and removably said adapter component to said base component, said adapter component having an intermediate annular flange with a flat radial rear face substantially contiguously engageable against the front end of said base component to limit the degree of insertion of said adapter rear end projection into said base socket, and said adapter component central hollow projection extending forward from said intermediate flange and being of a diameter substantially less than the diameter of said intermediate flange for receiving the resilient ring of the seal so that force applied to said base component rear end portion in a forward direction is transferred to the seal to press the rigid body of the seal into the vehicle housing hole.

2. The tool defined in claim 1, in which the axial length of the adapter component central projection is at least several times greater than the axial length of the seal.

3. The tool defined in claim 1, in which the depth of the base component sodket is at least as great as the length of the adapter component rear end projection.

4. The tool defined in claim 1, in which the outside diameter of the central hollow projection of the adapter component is greater than the inside diameter of the resilient inner ring of the annular seal so that such ring is expanded when inserted over such projection.

5. A tool for installing an annular seal having a substantially rigid outer body and a resilient inner ring in the hole of a vehicle housing into which a shaft of the vehicle extends, said tool comprising separate base and adapter components manually connectible to form an elongated composite driver having a rear end portion formed by said base component and a front end portion formed by said adapter component, said adapter component having a central hollow projection extending forward from said base component when said components are connected, the outer diameter of said central hollow projection being small enough that the resilient ring of the seal can be inserted over said central hollow projection so as to be carried thereby, the inner diameter of said central hollow projection being large enough that said central hollow projection can be inserted over the vehicle shaft, said base component being elongated and having a rear end portion adapted to have force applied to it, an elongated central portion forming a handle and a front end portion connected to said central portion, the front end of said base component forming an annular flange having a flat radial surface lying in a plane perpendicular to the axis of said base component and a central recess forming a socket encircled by said flange, said adapter component having a rear end projection shaped complementally to said base socket and manually insertable therein to connect snugly but manually and removably said adapter component to said base component, said adapter component having an intermediate annular flange with a flat radial rear face substantially contiguously engageable against the front end of said base component to limit the degree of insertion of said adapter rear end projection into said base socket, and said adapter component central hollow projection extending forward from said intermediate flange and being of a diameter substantially less than the diameter of said intermediate flange for receiving the resilient ring of the seal so that force applied to said base component rear end portion in a forward direction is transferred to the seal to press the rigid body of the seal into the vehicle housing hole.

* * * * *

UNITED STATES PATENT AND TRADEMARK OFFICE
CERTIFICATE OF CORRECTION

PATENT NO. : 4,586,228

DATED : May 6, 1986

INVENTOR(S) : Rodolf, Charles A.

It is certified that error appears in the above-identified patent and that said Letters Patent are hereby corrected as shown below:

Claim 1, column 4, line 64 and line 65, cancel "composite" and insert ...components...

Claim 3, column 5, line 33, cancel "sodket" and insert ...socket...

Signed and Sealed this

*Nineteenth* Day of *August 1986*

[SEAL]

*Attest:*

DONALD J. QUIGG

*Attesting Officer* *Commissioner of Patents and Trademarks*